United States Patent [19]

Horner et al.

[11] 4,364,981

[45] Dec. 21, 1982

[54] THREE LAYER FILM HAVING A CORE LAYER OF LOW PRESSURE, LOW DENSITY POLYETHYLENE

[75] Inventors: Jerome T. Horner, Indian Head Park; John Anthony, Downers Grove, both of Ill.; William A. Fraser, Princeton, N.J.

[73] Assignee: Union Carbide Corporation, Danbury, Conn.

[21] Appl. No.: 270,099

[22] Filed: Jun. 3, 1981

Related U.S. Application Data

[63] Continuation-in-part of Ser. No. 108,281, Dec. 28, 1979, abandoned.

[51] Int. Cl.³ .................. B32B 7/02; B28B 3/20; B32B 27/08; B65D 1/00
[52] U.S. Cl. ............................. 428/35; 264/173; 264/176 R; 428/212; 428/213; 428/218; 428/220; 428/332; 428/336; 428/339; 428/516
[58] Field of Search ............... 428/332, 516, 35, 36, 428/53, 246, 213, 216, 219, 220; 526/96, 98, 106; 264/173, 209, 176 R

[56] References Cited

U.S. PATENT DOCUMENTS

| | | | |
|---|---|---|---|
| 4,011,382 | 3/1977 | Levine et al. | 526/96 |
| 4,126,262 | 11/1978 | Thompson et al. | 428/516 X |
| 4,151,318 | 4/1979 | Marshall | 428/35 |
| 4,160,053 | 7/1979 | Clayton | 428/516 X |
| 4,169,910 | 10/1979 | Graboski | 428/35 |

OTHER PUBLICATIONS

"Mobilrap X Premium Quality Stretch Film", Nov. 1978, Mobil Corp., 150 E. 42nd St., N.Y., N.Y. 10017.

*Primary Examiner*—Thomas J. Herbert, Jr.
*Attorney, Agent, or Firm*—Real J. Grandmaison; John C. Lefever; Harrie M. Humphreys

[57] ABSTRACT

A flexible co-extruded three layer film comprising outer layers of high pressure, low density polyethylene and a core layer of low pressure, low density polyethylene. The film is produced by a blown film tubular extrusion process at conventional rates and temperature and yet is free of melt fracture even though the low pressure, low density polyethylene would otherwise exhibit melt fracture.

8 Claims, No Drawings

THREE LAYER FILM HAVING A CORE LAYER OF LOW PRESSURE, LOW DENSITY POLYETHYLENE

This application is a continuation-in-part application of Ser. No. 108,281, filed Dec. 28, 1979, now abandoned.

The invention relates to a multilayer film and particularly relates to a flexible co-extruded film having three layers and adapted for forming a bag such as a trash bag.

It is known in the prior art that in the process of melt extruding certain plastics and especially narrow molecular weight distribution polyolefins a phenomena known as melt fracture can occur at high throughput rates. This problem is more severe at relatively cooler conventional melt temperatures, for conventional narrow die gaps, and for relatively high melt viscosities.

It has now been found that narrow molecular weight distribution low pressure, low density polyethylene exhibits melt fracture at conventional film melt extrusion conditions at conventional throughput rates. In contrast, high pressure, low density polyethylene does not exhibit melt fracture under comparable conditions.

Briefly, melt fracture is a phenomena of surface irregularities also known in the art as "shark skin". It is characterized by a series of ridges perpendicular to the flow direction. In some cases, the melt fracture results in a matt appearance and the extrudate exhibits a loss of surface gloss. In extreme cases, the melt fracture can adversely affect physical properties.

The occurrence of melt fracture for narrow molecular weight distribution low pressure, low density polyethylene is particularly pronounced at the lower extrusion temperatures normally associated with conventional blown film extrusion. The use of a higher melt temperature could result in instabilities in the bubble which forms part of the blown film process and also presents difficulty in cooling the extrudate by conventional air cooling procedures.

The elimination of melt fracture for the melt extrusion of narrow molecular weight distribution low pressure, low density polyethylene is of great importance because such polyethylene can be obtained economically and has been found to provide good physical properties in the form of a flexible film which is suitable for commercial use such as a trash bag.

The narrow molecular weight distribution low pressure, low density polyethylene as used herein refers to a linear polymer having short branches and a narrow molecular weight distribution and typically exhibits a flow rate ratio of from about 25 to about 100. These polyethylenes are produced by low pressure processes such as disclosed in U.S. Pat. No. 4,011,382 and European Patent Application No. 0 006 110.

The low pressure, low density polyethylene as used herein is characterized by the appearance of melt fracture during blown film melt extrusion of a single layer film at a rate of from about 4 to about 20 pounds per hour per inch of die circumference for a die gap in the range of from about 15 to about 50 mils for a process melt temperature in the range of from about 350° F. to about 470° F.

The invention relates to a flexible co-extruded three layer film comprising outer layers of high pressure, low density polyethylene and a core layer of low pressure, low density polyethylene, produced by the conventional blown film extrusion process.

In particular, the film of the invention is produced by the blown film extrusion process at conventional throughput rate of from about 4 to about 25 pounds per hour per inch of die at process temperature of from about 350° F. to about 600° F. and is free of melt fracture.

The film of the invention is produced preferably by conventional blown film processes at a throughput rate of from about 4 to about 20 pounds per hour and at a process temperature of the melt in the range of from about 350° to about 470° F.

Preferably, the film of the invention is produced by tubular extrusion and formed into a bag by slitting one side to define a bag opening and an opposite portion defines a bag bottom with the bag side edges being formed by heat sealing.

Illustrative, non-limiting examples of the practice of the invention are set out below. Numerous other examples can readily be evolved in the light of the guiding principles and teachings contained herein. The examples given herein are intended merely to illustrate the invention and not in any sense to limit the manner in which the invention can be practiced. The parts and percentages cited herein and all through the specification unless specifically stated otherwise refer to parts by weight and percentages by weight.

The following are the test criteria used.

Tensile strength was measured by ASTM D882 method A. Load at break was reported in pounds per inch of specimen width (lbs/inch).

Tensile energy was measured by ASTM SD882 method A. The energy to break the specimen is recorded as the integrated area under the load-elongation curve. The unit of measure is inch-pounds (inch-lbs) and refers to a specimen one inch wide for the given thickness being measured.

Ultimate elongation was measured by ASTM D882 method A and is the measure of the percent elongation of the specimen at failure.

Elmendorf tear was measured by ASTM D1992 and is reported in grams (gm).

Spencer impact was measured by ASTM D3420-75 procedure B and is reported in grams (gm).

Puncture toughness is a test originated to evaluate the relative resistance of a film to being punctured. There is no ASTM standard. Basically, a ¾ inch round steel plunger is pushed through a clamped film specimen at a speed of 20 inches per minute using a modified Instron Tester. The load to puncture of the film specimen is recorded in pounds (lbs) and the energy to puncture is the integrated area under the load-elongation curve and is recorded in inch-pounds (inch-lbs). For the examples given herein, the outer layers were high pressure, low density polyethylene having a density of about 0.918 grams per cubic centimeter and a melt index of about 2.1 decigrams per minute.

Melt index was determined by ASTM D-1238-Condition E—measured at 190° C. and reported as grams per 10 minutes.

Flow index was determined by ASTM D-1238-Condition F—measured at 10 times the weight used in the melt index and reported as grams per 10 minutes.

Melt Flow Ratio is defined as the ratio of Flow Index divided by Melt Index.

In accordance with conventional practice, the examples were carried out using various known additives. Generally, additives include slip agents, coloring agents, antiblock agents, antioxidants, and the like.

It has been discovered that the outer layers can be as thin as about 0.18 mil and still be effective in preventing the occurrence of melt fracture in the film of the invention. The outer layers can be as thick as about 0.35 mil or more, but economics favor a thickness of less than about 0.35 mils and preferably thinner. The strength of the film of the invention arises primarily from the core layer. The low pressure, low density polyethylenes used in the examples for the core layers are shown in Table I.

TABLE I

| Core Layer | Density gm/cm³ | Melt Index dg/min |
|---|---|---|
| PE A | 0.920 | 2.0 |
| PE B | 0.920 | 1.0 |
| PE C | 0.920 | 3.0 |
| PE D | 0.926 | 2.0 |

Generally, the core layer has a thickness of about three times the respective outer layers. The overall thickness of the three layer film is from about 1.0 to about 3.0 mils and preferably about 1.5 mils.

EXAMPLE ONE

Tests were carried out to determine the extrusion conditions for the onset of melt fracture for various low pressure, low density polyethylenes for single layer films as a function of throughput rate, melt process temperature, and die gap. Conventional blown film processes were used.

In the art, it is conventional to state throughput rate as mass per unit time passing out of a die gap per circumferential distance for a tubular extrusion system.

For PE A (2.0 dg/min), it was found that the onset of melt fracture occurred at a throughput rate of about 2.25 pounds per hour per inch of circumference for a die gap of 30 mils at a melt process temperature of about 470° F. A smaller die gap and/or a lower temperature would have resulted in the onset of melt fracture at even a lower throughput rate.

For PE B (1.0 dg/min), it was found that the onset of melt fracture occurred at a throughput rate of about 2.0 pounds per hour per inch of circumference for a die gap of 45 mils at a melt process temperature of about 470° F.

For PE C (3.0 dg/min), it was found that the onset of melt fracture occurred at a throughput rate of about 3.5 pounds per hour per inch of circumference for a die gap of 30 mils at a temperature of about 470° F.

These tests show that low pressure, low density polyethylene would be unsuited for economical commercial operations for the production of single layer films by conventional methods because of the occurrence of melt fracture at throughput rates even at the low end of commercial interest.

EXAMPLE TWO

Using conventional blown film processes for a tubular die gap of about 30 mils and a core layer of PE A, two three-layer films were produced. One film had outer layers each having a thickness of about 0.18 mil and a core layer having a thickness of about 1.4 mils. The throughput rate was about 5.3 pounds per hour per inch of circumference.

The other film had outer layers each having a thickness of about 0.29 mil and a core layer of about 0.86 mil. The throughput rate was about 6.5 pounds per hour per inch of circumference. For both films, no melt fracture was present.

EXAMPLE THREE

Using conventional blown film processes, a three layer film was made. The core layer was PE B and had a thickness of about 0.98 mil. The outer layers each had a thickness of about 0.26 mil. The die gap was 30 mils and the throughput rate was about 3.5 pounds per hour per inch of circumference.

No melt fracture was present.

EXAMPLE FOUR

The blown film processes of the previous examples were used to produce three multilayer films of the invention. The die gap was 30 mils, the overall film thickness was about 1.5 mils, and the ratio of the layer thicknesses was 1:3:1.

The core layers of the respective films A, B, and C were PE A, PE B, and PE C. For comparison, a control film having three layers with the core layer the same as the outer layers was made. Table 2 shows the measured properties of the films.

TABLE 2

| Property | Film A | Film B | Film C | Control |
|---|---|---|---|---|
| Core Layer | PE A | PE B | PE C | same as outside layers |
| Puncture Toughness: | | | | |
| Load, lbs. | 6.8 | 7.1 | 6.6 | 7.2 |
| Energy, in-lbs. | 10.3 | 11.3 | 9.5 | 6.3 |
| Tensile Strength lbs/in | | | | |
| MD | 4.5 | 5.3 | 3.6 | 5.1 |
| TD | 4.6 | 4.3 | 4.0 | 2.8 |
| Elmendorf Tear gm | | | | |
| MD | 109 | 100 | 81 | 727 |
| TD | 472 | 565 | 446 | 137 |
| Spencer Impact gm | 440 | 430 | 400 | 650 |
| Tensile Energy in-lbs. | | | | |
| MD | 32.6 | 36.0 | 23.2 | 9.8 |
| TD | 36.1 | 32.1 | 31.2 | 21.5 |
| Ultimate Elongation, % | | | | |
| MD | 500 | 500 | 390 | 130 |
| TD | 660 | 580 | 630 | 500 |

From Table 2, it can be seen that the physical properties exhibited by the three layer films of the invention were very good. None of the films showed melt fracture.

It is of particular interest that the blown film of the invention showed a surprising increase in tensile strength in the transverse direction (TD) whereas the tensile strength in the machine direction (MD) is usually the greater of the two directions for conventional high pressure low density polyethylene blown film.

The strength in the transverse direction can be used in a beneficial manner to form an improved trash bag.

In accordance with conventional practice, a bag can be formed from the tubular film by slitting the tubular film along its length so that the slitted portion becomes the bag opening and the opposite portion becomes the bag bottom. The two bag side edges are defined by two continuous heat seals perpendicular to the bag bottom and the bag opening. For this bag, the TD strength is in the direction extending from the bag bottom to the bag opening and thereby results in providing strength against a failure resulting from the lifting of a loaded bag from the top.

It is understood that the term "film" is not intended to be limiting and includes sheets, tubes, straws and the like.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A flexible co-extruded three-layer film comprising outer layers of high pressure, low density, polyethylene and a core layer of low pressure, low density polyethylene, said film having been produced by a conventional blown film tubular extrusion process at a throughput rate of from about 4 to about 25 pounds per hour per inch of die at a process temperature of from about 350° F. to about 600° F., said film being characterized as free of melt fracture and having a tensile strength in the transverse direction of at least about 4.0 pounds per inch.

2. The film of claim 1, wherein the thickness of the outside layers are each from about 0.18 to about 0.35 mil.

3. The film of claim 1, wherein the ratio of the thicknesses of the respective layers is 1:3:1.

4. The film of claim 1, wherein the overall film thickness is from about 1.0 to about 3.0 mils.

5. The film of claim 1, wherein the overall film thickness is about 1.5 mils.

6. The film of claim 1, wherein the film tensile strength in the transverse direction is higher than the tensile strength in the transverse direction for a control three layer film in which the core layer is the same high pressure low density polyethylene as the outer layers, said control three layer film being otherwise identical to said film.

7. A bag formed from the film of claim 1 wherein the film has been produced at a throughput rate of from about 4 to about 20 pounds per hour per inch of die at a process temperature of from about 350° F. to about 470° F.

8. A bag formed from the film of claim 1.

* * * * *